Figure 1:
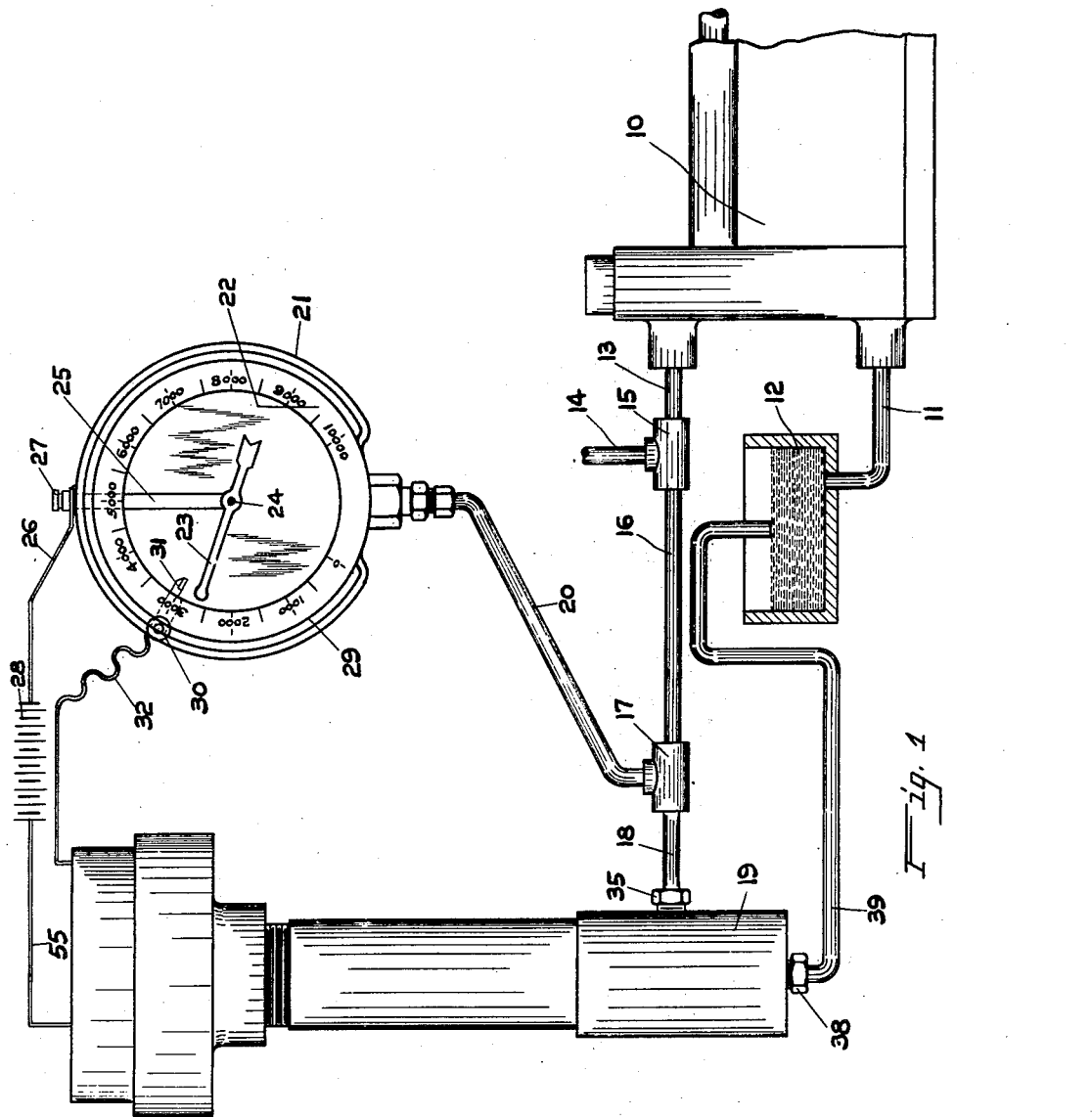

Aug. 12, 1930.                F. B. STEARNS                1,772,879
                          PRESSURE REGULATING DEVICE
                          Filed Oct. 29, 1924        2 Sheets-Sheet 1

INVENTOR
Frank B. Stearns
BY
W. M. Hart.
ATTORNEY

Aug. 12, 1930.　　F. B. STEARNS　　1,772,879
PRESSURE REGULATING DEVICE
Filed Oct. 29, 1924　　2 Sheets-Sheet 2
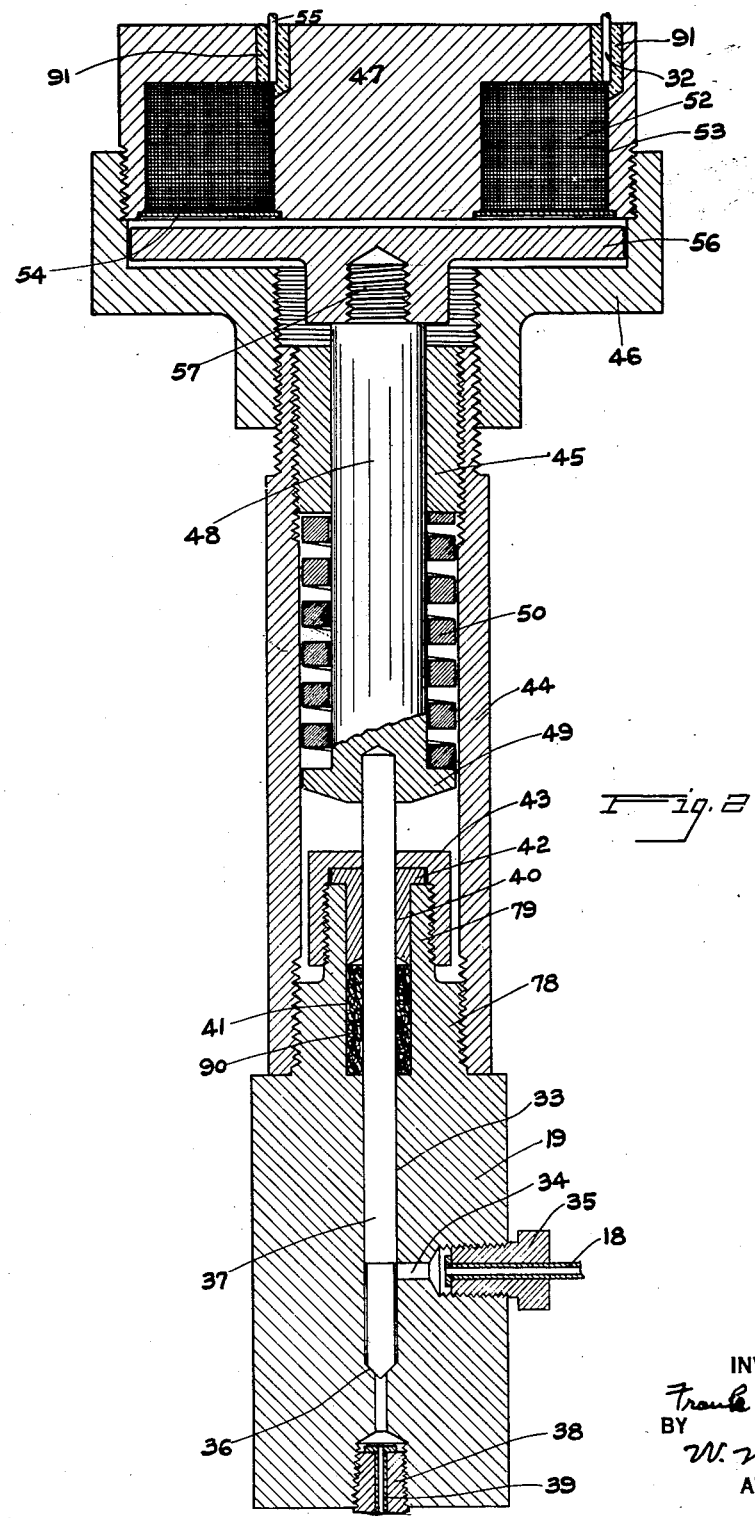
INVENTOR
Frank B. Stearns
BY
W. M. Hart.
ATTORNEY Patented Aug. 12, 1930

1,772,879

UNITED STATES PATENT OFFICE

FRANK BALLOU STEARNS, OF CLEVELAND, OHIO

PRESSURE-REGULATING DEVICE

Application filed October 29, 1924. Serial No. 746,706.

This invention relates to pressure regulators, and more particularly to the type used with fluid fuel feeding systems of internal combustion engines.

An object of my invention is to provide a pressure regulating device that can be associated with the fuel feeding system of engines, for automatically maintaining the volume and pressure of the fuel in the feeding system substantially constant.

Another object of my invention is to provide a pressure regulating device, that can be associated with fuel feeding systems, which can be adjusted to provide variations in the pressure of the fluid within the feeding system and which will automatically maintain the fluid in the feeding system substantially constant and at the desired pressure.

Still another object of my invention is to provide a pressure regulating device, that can be associated with the fuel feeding system of an engine, in which a relief passage is opened by electrical mechanism controlled by a pressure gage to maintain the fuel within the feeding system at a constant predetermined pressure.

Still another object of my invention is to provide a pressure regulator which is simple in construction and which will operate automatically to maintain a constant but variable pressure on the fluid in a fuel feeding system for engines.

These and other objects, and the invention itself will appear in the following specification.

In the accompanying drawings, illustrating an embodiment of my invention, Figure 1 is a side elevation of the pressure regulating mechanism associated with the fuel feeding system of an engine; and Fig. 2 is a medial vertical sectional view of the regulator housing showing the valve and the electrical mechanism for unseating the same.

Referring now to the drawings by characters of reference, 10 represents a fluid fuel pump of any conventional type which may be employed to force fuel under pressure through the feeding system of an engine to the explosion chamber thereof. Fluid fuel is supplied by gravity, or in any other conventional manner, to the pump through a conduit 11, which is connected with a fuel container, or reservoir 12. An outlet conduit 13 extends from the pump and is connected with a conduit 14, which leads to the explosion chamber of an internal combustion engine, by a union 15. It will be understood that a valve is opened intermittently to admit fuel from the conduit 14 to the explosion chamber in the usual manner.

A conduit 16 is secured to the union 15 and provides an open communication between the pump outlet conduit, the engine inlet conduit, and the pressure regulating mechanism. A union 17 is secured to the other end of the conduit 16, and a conduit 18 leads therefrom to the regulator housing 19. A pipe 20 leads from the union 17 to the fluid pressure indicating gage 21.

The gage 21 is mounted upon, or adjacent to the engine and is provided with a circular face 22, upon which graduations are placed to indicate pounds pressure. An indicator 23 is rotatably mounted upon a stem 24 which is secured centrally of the face 22. A contact member 25 extends from the stem 23 exteriorly of the gage frame, the exterior end thereof providing a terminal to which one end of a conducting wire 26 is secured by a nut 27. The other end of this wire is connected with a battery 28. The gage frame is provided with a circularly extending slot 29 in which the stem 30 of a contact member 31 is slidably mounted. The contact member can be adjusted to be positioned adjacent any of the graduations on the gage face, and one end of a conducting wire 32 is secured thereto. The inner end of the contact member extends in the path of the rotation of the indicator, so that when the indicator is moved into engagement therewith, the indicator 23 and the contact 25 complete a circuit between the member 31 and the wire 26. Conventional mechanism, usual in fluid pressure gages, is provided in the gage so that the indicator will respond to the pressure on the fluid in the conduit 20, to register the amount of pressure on the gage face.

The housing 19 is provided with a bore 33 extending longitudinally therethrough, and with a transversely extending passage 34 which is in open communication with the lower end of the bore. The outer end of the passage 34 is of a larger diameter and threaded to receive an exteriorly threaded stud 35. The conduit 18 extends through an axial passage in the stud, and is flanged at its end to prevent displacement of the conduit, thus when the stud is screwed into the passage 34 it will maintain the pipe in open leakproof communication with the bore 33 in the housing. The bore 33 is reduced in diameter intermediate the passage 34 and the lower end thereof, providing a seat 36 for the valve stem 37. The exterior end of the bore 33 is enlarged to receive an exteriorly threaded stud 38 which retains the end of a conduit 39 in leakproof communication with the lower end of the bore 33. The other end of the conduit 39 extends into the fuel reservoir 12. The end of the valve stem 37 is arranged to seat upon the shoulder 36 and close the bore 33, intermediate the conduits 18 and 39. The diameter of the valve stem is slightly reduced intermediate the passage 34 and its end, so that fluid fuel can pass through the exterior end of the bore 33 from the passage 34, when the valve stem is unseated.

The upper end of the housing is provided with two reduced threaded portions 78 and 79. A gland 40 extends into the enlarged end 41 of the bore 33 which forms a packing box, and is preferably provided with a flanged end 42. An internally threaded cap 43 secures the gland in position. The gland serves to retain the packing 90 within the packing box when the cap 43 is screwed thereagainst. The valve stem extends through central apertures in the gland and cap, which also serve as guides therefore.

A cylindrical casing 44 is threaded internally at one end, and is screwed upon the threaded portion 78 of the housing. The opposite end of the casing 44 is provided with internal and external threads, and a cylindrical bushing 45 is screwed into the end of the casing, while a cup shaped supporting member 46 is screwed upon the exterior end of the casing. A magnet housing 47 is screwed into the upper end of the supporting member, above the casing 44, and a plunger 48 is slidably mounted in a central aperture through the bushing 45. The lower end 49 of the plunger is flanged and is of a diameter substantially that of the interior of the casing 44. The upper end of the valve stem extends into the casing 44 and is secured to the plunger. A coil spring 50 extends around the plunger within the casing 44, and one end bears against the flanged end thereof while the other end thereof bears against the lower end of the bushing 45. It will be seen that the spring 50 will normally exert pressure against the flanged end of the plunger, which is of sufficient tension to maintain the valve stem against its seat in the housing, thereby closing the passage of fluid between the conduits 18 and 39.

The magnet housing 47 is threaded exteriorly at one end and is screwed into the holder 46. The inner end of the magnet housing is provided with an annular groove 53, and a wire 52 is carried within the groove. A washer 54 extends into the groove in the magnet housing and serves to retain the coil within the groove. The outer end of the magnet housing is provided with insulated apertures 91 through which the ends of the wire coil extend, one end of the coil 55 extending to the battery and the other end of the coil being the wire 32 previously described.

The inner end of the magnet housing is secured and spaced from the holder 46, and an armature 56 is slidably housed therebetween. The end 57 of the plunger is screwed into the armature and moves integrally therewith. When the magnetic coil 52 is energized, it will cause the armature to be attracted thereto, and thus move the plunger upwardly thereby unseating the valve stem from its seat 36, permitting the fluid to pass from the conduit 18 into the conduit 39. The pressure on the fluid fuel in the feeding system is in this manner relieved.

The pressure regulating mechanism functions in the following manner to maintain a substantially constant pressure on the fuel in the feeding system. The contact member 31 is first adjusted so that it is slightly in advance of the graduation on the gage face which denotes the pressure per square inch at which it is desired that the fuel be projected into the explosion chamber of the engine. Such adjustment can be made either before the engine is started or while the engine is running, and it is to be understood that a greater pressure is needed when the engine is operating under full load, or a heavy load, than when it is operating under reverse conditions. The bore 33 is normally closed by the valve 37, so that the pressure is generated on the fuel, by the pump, in the conduits 13, 14, 16, 18 and 20 while the valve is seated. The pressure on the fuel in the conduit 20 will cause the indicator to move to the graduation on the gage corresponding to the pressure thereon. When the pressure on the fuel, in the conduits mentioned, is equal to that of the graduation at which the contact member 31 is set, the indicator will engage therewith and will provide a connecting switch between the contact member 25 and the wire 32, thus closing a circuit from the battery to the coil 52. When the circuit is closed the magnet will be energized and will attract the armature 56, raising it upwardly with the plunger and valve stem, thereby opening the passage between the conduits 18 and 39. While the passage is open the fluid will flow from the feeding system into the reservoir, thereby relieving the pressure on the fuel in the feeding system. As soon as the pressure on the fuel is reduced, the indicator will move away from the contact member 31, breaking the circuit and thereby deenergizing the coil, whereupon the spring 50 will move the valve stem against its seat. There will be a slight fluctuation of the pressure on the fuel in the feeding system, as the valve is opened and closed, but the mechanism will maintain the fuel in the feeding system at substantially a contant pressure at which the gage is set.

It will be seen that the regulating mechanism is positive in its action, and that besides automatically maintaining a constant pressure on the fuel in the feeding system, it also serves to prevent any pressure on the fuel in excess of the predetermined amount at which the contact member on the gage is set.

Various changes can be made in the details and arrangement of the embodiment of the above described invention, without departing from the spirit thereof and the scope of the appended claims.

What I claim is:

1. A fluid pressure relieving device comprising a tubular housing, having a longitudinal bore providing a fluid passage communicating with the bore of the housing, said passage having a reduced portion and an enlarged portion, a rod adapted to be axially reciprocated in the enlarged portion of the passage, said reduced and enlarged portions joined to form a shoulder providing a valve seat, said rod terminating in a reduced pointed valve end adapted to engage the valve seat, a wall of the passage having a fluid inlet opening therethrough for admitting fluid under pressure to the space around the reduced end of the rod, an electromagnet at the opposite end of the tubular housing, an armature adapted to be operated by said electromagnet, disposed intermediate said electromagnet and said rod, a valve stem joining the enlarged end of the rod to said armature, a bushing longitudinally adjustably screw threaded into the tubular housing from the electromagnet end thereof, said bushing engageable with said valve stem to form a bearing therefor, said valve stem having an annular radially extending flange, said valve stem being disposed axially of the tubular housing with lateral walls spaced therefrom, a compression spring interposed between said bushing and said valve, adapted to simultaneously retract the armature from the magnet and to press the valve to its seat, said electromagnet when energized, adapted to lift the valve against the pressure of said spring to effect communication of fluid from said inlet port to the reduced exhaust passage in said element beyond said valve.

2. A fluid pressure relieving device comprising a tubular housing, having a longitudinal bore providing a fluid passage communicating with the bore of the housing, said passage having a reduced portion and an enlarged portion, a rod adapted to be axially reciprocated in the enlarged portion of the passage, said reduced and enlarged portions joined to form a shoulder providing a valve seat, said rod terminating in a reduced pointed valve end adapted to engage the valve seat, a wall of the passage having a fluid inlet opening therethrough for admitting fluid under pressure to the space around the reduced end of the rod, an electromagnet at the opposite end of the tubular housing, an armature adapted to be operated by said electromagnet, disposed intermediate said electromagnet and said rod, a valve stem joining the enlarged end of the rod to said armature, a bushing longitudinally adjustably screw threaded into the tubular housing from the electromagnet end thereof, said bushing engageable with said valve stem to form a bearing therefor, said valve stem having an annular radially extending flange, said valve stem being disposed axially of the tubular housing with lateral walls spaced therefrom, a compression spring interposed between said bushing and said valve, adapted to simultaneously retract the armature from the magnet and to press the valve to its seat, said electromagnet when energized, adapted to lift the valve against the pressure of said spring to effect communication of fluid from said inlet port to the reduced exhaust passage in said element beyond said valve, the pointed valve end of the rod engaging to the limit of its peripheral portion, with the converging walls of the passage forming the valve seat, the reduced valve end of the rod being nearly as large as the relatively enlarged portion thereof, to limit the valve unseating pressure effect of fluid under pressure confined in the space between the closed valve port and the shoulder formed by the junction of the enlarged and reduced portions of the rod.

3. A valve mechanism comprising a housing having a longitudinal bore providing joined relatively reduced and enlarged portions, a valve rod axially reciprocable in the enlarged portion, said rod being of slightly reduced diameter near an end, said end adapted to be seated against the shoulder at the junction of said passage portions, a lateral wall of the housing being bored to provide an opening for admitting fluid to the bore around the reduced end of the rod, an electromagnet, an armature therefor, supporting the enlarged end of the rod and reciprocable under the influence of the magnet to reciprocate the rod to open and close the passage, a tubular element longitudinally adjustably secured to the housing, said rod extending through said tubular element, a compression spring telescoped over said rod within said tubular element, and exerting pressure tending to seat said valve rod and retract said armature, and separate means for longitudinally adjustably spacing said electromagnet and said armature.

Signed at Cleveland, in the county of Cuyahoga and State of Ohio, this 21st day of October, 1924.

FRANK B. STEARNS.